(12) United States Patent
Wei et al.

(10) Patent No.: US 11,789,897 B2
(45) Date of Patent: Oct. 17, 2023

(54) DATA PROCESSING CIRCUIT, DATA PROCESSING METHOD, AND ELECTRONIC DEVICE

(71) Applicants: Beijing BOE Technology Development Co., Ltd., Beijing (CN); BOE Technology Group Co., Ltd., Beijing (CN)

(72) Inventors: Xiangye Wei, Beijing (CN); Liming Xiu, Beijing (CN)

(73) Assignees: BOE TECHNOLOGY DEVELOPMENT CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 208 days.

(21) Appl. No.: 17/427,235

(22) PCT Filed: Oct. 27, 2020

(86) PCT No.: PCT/CN2020/124032
§ 371 (c)(1),
(2) Date: Jul. 30, 2021

(87) PCT Pub. No.: WO2022/087829
PCT Pub. Date: May 5, 2022

(65) Prior Publication Data
US 2022/0318185 A1    Oct. 6, 2022

(51) Int. Cl.
*G06F 15/80* (2006.01)
*G06F 9/30* (2018.01)

(52) U.S. Cl.
CPC .......... *G06F 15/80* (2013.01); *G06F 9/30134* (2013.01)

(58) Field of Classification Search
None
See application file for complete search history.

(56) References Cited

U.S. PATENT DOCUMENTS 6,163,563 A * 12/2000 Baker .................... H04B 1/707
375/150
6,934,308 B1 * 8/2005 Yonenaga ............. H04L 25/497
370/535

(Continued)

FOREIGN PATENT DOCUMENTS

| CN | 109426738 A | 3/2019 |
| CN | 109766729 A | 5/2019 |
| CN | 111444518 A | 7/2020 |

OTHER PUBLICATIONS

Latches and flip-flops with English translation attached.

*Primary Examiner* — Eric Coleman
(74) *Attorney, Agent, or Firm* — Nath, Goldberg & Meyer; Joshua B. Goldberg

(57) ABSTRACT

A data processing circuit, a data processing method, and an electronic device are provided. The data processing circuit includes a first data processing sub-circuit and a second data processing sub-circuit. An output terminal of the first data processing sub-circuit is connected to an input terminal of the second data processing sub-circuit. The first data processing sub-circuit is configured to receive an original sequence to generate a first processed sequence. Each of first processed numbers in the first processed sequence is calculated from at least two pieces of original data in the original data. The second data processing sub-circuit is configured to receive the first processed sequence to generate a second processed sequence.

14 Claims, 5 Drawing Sheets

(56) References Cited

U.S. PATENT DOCUMENTS

| | | | |
|---|---|---|---|
| 10,727,994 B2* | 7/2020 | Sanderovich | H04L 27/26132 |
| 2007/0065157 A1* | 3/2007 | Katagiri | H04B 10/66 |
| | | | 398/155 |
| 2010/0202555 A1* | 8/2010 | Takahashi | H04L 25/4919 |
| | | | 375/292 |
| 2016/0219537 A1* | 7/2016 | Adhikary | H04W 4/70 |
| 2018/0074791 A1 | 3/2018 | Atsumi et al. | |

* cited by examiner

DATA PROCESSING CIRCUIT, DATA PROCESSING METHOD, AND ELECTRONIC DEVICE

This is a National Phase application filed under 35 U.S.C. 371 as a national stage of PCT/CN2020/124032, filed Oct. 27, 2020, content of which is hereby incorporated by reference in its entirety.

TECHNICAL FIELD

The present disclosure relates to the technical field of digital integrated circuit, and in particular, to a data processing circuit, a data processing method, and an electronic device.

BACKGROUND

The internet terminal index has been increased due to the rapid development of the internet of things. With the improvement of the AI technology, more application scenes in the future are machine-to-machine communication, therefore information security is the most basic requirement for equipments in the future.

At present, in order to quickly occupy the market, many manufacturers of the internet terminal devices do not even adopt a security module, or some manufacturers only adopt a simple key module and a software algorithm, therefore, a great security risk exists. For example, hackers can learn an architecture model of a circuit from random numbers of a terminal chip or fragment data of a key through a machine learning technology, and predict data to be generated in the future by setting parameters. Once data same as that of the terminal chip is generated, the hackers can be invaded into a chip kernel, thereby threatening the security of the terminal device.

SUMMARY

The present disclosure intends to solve at least one of the technical problems existing in the prior art and thus provide a data processing circuit, a data processing method and an electronic device.

A data processing circuit is provided in the present disclosure. The data processing circuit includes a first data processing sub-circuit and a second data processing sub-circuit.

An output terminal of the first data processing sub-circuit is connected to an input terminal of the second data processing sub-circuit.

The first data processing sub-circuit is configured to receive an original sequence to generate a first processed sequence, wherein each of first processed numbers in the first processed sequence is calculated from at least two pieces of original data in the original data.

The second data processing sub-circuit is configured to receive the first processed sequence to generate a second processed sequence, wherein $n^{th}$ second processed number in the second processed sequence is calculated from $n^{th}$ first processed number and $(n-1)^{th}$ second processed number, n is a positive integer more than or equal to two.

In some embodiments, the first data processing sub-circuit includes a first register and a data selector connected to each other.

The first register is configured to receive the original data.

The data selector is configured to receive the original data stored in the first register to generate the first processed sequence.

In some embodiments, the first data processing sub-circuit includes three first registers and one data selector. The three first registers are cascaded in sequence. A first one of the three first registers is configured to receive the original sequence, each of the three first registers is connected to the data selector, and the data selector is configured to output the first processed sequence.

In some embodiments, the first data processing sub-circuit is configured to perform a first predetermined algorithm on the original sequence and to generate the first processed sequence based on the original sequence.

The first predetermined algorithm includes: $fa(n)=s_{n+2}\cdot s_n + \overline{s_{n+2}}\cdot s_{n+1}$, wherein $fa(n)$ is a first processed number, $s_n$ is $n^{th}$ piece of original data of the original sequence, $s_{n+1}$ is $(n+1)^{th}$ piece of original data of the original sequence, and $s_{n+2}$ is $(n+2)^{th}$ piece of original data of the original sequence.

In some embodiments, the first register includes a first D flip-flop.

In some embodiments, the second data processing sub-circuit includes a logic processing circuit and a second register.

An input terminal of the logic processing circuit is connected to the output terminal of the first data processing sub-circuit, an output terminal of the logic processing circuit is connected to an input terminal of the second register, and the output terminal of the logic processing circuit serves as an output terminal of the second processing sub-circuit.

The logic processing circuit is configured to receive a $n^{th}$ first processed number in the first processed sequence generated by the first data processing sub-circuit and a $(n-1)^{th}$ second processed number in the second processed sequence stored in the second register and perform a logic operation on the $n^{th}$ first processed number in the first processed sequence generated by the first data processing sub-circuit and the $(n-1)^{th}$ second processed number in the second processed sequence stored in the second register, to obtain $n^{th}$ second processed number in the second processed sequence.

In some embodiments, the logic processing circuit includes an XOR gate and the second register includes a second D flip-flop. An output terminal of the second D flip-flop is connected to an input terminal of the XOR gate, an output terminal of the XOR gate is connected to an input terminal of the second D flip-flop, and the output terminal of the XOR gate serves as an output terminal of the second processing sub-circuit.

In some embodiments, the data processing circuit further includes an original sequence generation sub-circuit configured to randomly generate the original sequence.

In some embodiments, the original sequence generation sub-circuit includes a random data generator or a digital chip fingerprint generator.

In some embodiments, the data processing circuit further includes an output sub-circuit configured to output the second processed sequence in a form of an image.

In some embodiments, the image includes a digital image or a color image.

Accordingly, an embodiment of the present disclosure further provides a data processing method applied for above data processing circuit. The method includes: receiving, by the first data processing sub-circuit, an original sequence to generate a first processed sequence, wherein each of first processed numbers in the first processed sequence is calculated from at least two pieces of original data in the original data; and receiving, by the second data processing sub-circuit, the first processed sequence to generate a second processed sequence, wherein $n^{th}$ second processed number in the second processed sequence is calculated from $n^{th}$ first processed number and $(n-1)^{th}$ second processed number, n is a positive integer more than or equal to two.

Accordingly, an embodiment of the present disclosure further provides an electronic device including above data processing circuit.

DETAILED DESCRIPTION

In order to make the objects, technical solutions and advantages of the embodiments of the present disclosure more apparent, the technical solutions of the embodiments of the present disclosure will be clearly and completely described below with reference to the accompanying drawings of the embodiments of the present disclosure. It is to be understood that the described embodiments are only a part but not all of embodiments of the present disclosure. All other embodiments, which can be derived by one of ordinary skill in the art from the described embodiments of the present disclosure without inventive step, fall within the scope of the present disclosure.

The terminology used herein for describing the embodiments of the present disclosure is not intended to limit and/or define the scope of the present disclosure. For example, unless otherwise defined, technical or scientific terms used herein shall have the ordinary meaning as understood by one of ordinary skill in the art to which this disclosure belongs. It should be understood that the terms "first," "second," and the like, as used in the present disclosure, do not denote any order, quantity, or importance, but rather are used to distinguish one element from another. The singular forms "a", "an", or "the" and similar referents do not denote a limitation of quantity, but rather denote the presence of at least one, unless the context clearly dictates otherwise.

It will be further understood that the terms "include", "comprise" or the like, mean that the element or item preceding the word is intended to cover the element or item listed after the word and its equivalent, but not to exclude other elements or items. The terms "connect", "couple," or the like, are not restricted to physical or mechanical connections, but may include electrical connections, whether direct or indirect. "Upper", "lower", "left", "right", and the like are used only to indicate relative positional relationships, and when the absolute position of the object being described changes, the relative positional relationships may also be changed accordingly.

Figure 1:
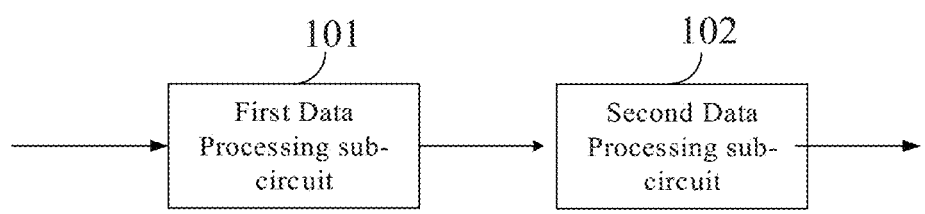
FIG. 1 is a schematic diagram showing a structure of a data processing circuit according to an embodiment of the present disclosure.

As a first aspect, an embodiment of the present disclosure provides a data processing circuit. FIG. 1 is a schematic diagram showing a structure of a data processing circuit provided in an embodiment of the present disclosure. As shown in FIG. 1, the data processing circuit 100 includes a first data processing sub-circuit 101 and a second data processing sub-circuit 102. An output terminal of the first data processing sub-circuit 101 is connected to an input terminal of the second data processing sub-circuit 102. An input terminal of the first data processing sub-circuit 101 is configured to receive an original sequence, and an output terminal of the second data processing sub-circuit 102 is configured to output a second processed sequence.

In the present embodiment, the first data processing sub-circuit 101 is configured to generate a first processed sequence based on the original sequence. The first processed sequence has a plurality of first processed numbers therein. Each of the first processed numbers in the first processed sequence is calculated from at least two pieces of original data in the original data.

The original sequence is a data sequence to be encrypted, and the original sequence contains a plurality pieces of original data. The first data processing sub-circuit 101 is configured to receive the original sequence including the plurality pieces of original data, calculate each of the first processed numbers according to at least two pieces of original data to obtain the first processed sequence, and output the first processed sequence to the second data processing sub-circuit 102.

It should be noted that the original sequence is a sequence including a plurality of binary numbers, and one of the binary numbers in the original sequence is one piece of original data. For example, the original sequence is 0110001, with one "0" or one "1" representing one piece of original data. The first processed sequence is a new binary number sequence generated, by the first data processing sub-circuit 101, according to the original binary number sequence. Each of the first processed numbers in the first processed sequence is calculated from at least two binary numbers in the original binary number sequence.

In the present embodiment, the second data processing sub-circuit 102 is configured to generate a second processed sequence based on the first processed sequence. The $n^{th}$ second processed number in the second processed sequence is calculated according to the $n^{th}$ first processed number and the $(n-1)^{th}$ second processed number, wherein n is a positive integer more than or equal to two.

The second processed sequence is an encrypted data sequence. The second processed sequence includes a plurality of second processed numbers. The second data processing sub-circuit 102 calculates the $n^{th}$ second processed number according to the $n^{th}$ first processed number and the $(n-1)^{th}$ second processed number based on the acquired first processed sequence, so as to obtain the second processed sequence.

In the embodiment, the first data processing sub-circuit generates the first processed sequence based on the original sequence, and the second data processing sub-circuit generates the second processed sequence based on the first processed sequence, such that the generated second processed sequence can be more complex and more random than the original sequence.

In some embodiments, the first data processing sub-circuit includes a first register and a data selector. The first register is connected to the data selector. The first register is configured to receive original data. The data selector is configured to receive the original data stored by the first register to generate the first processed sequence. In the embodiment of the present disclosure, the numbers of the first register and the data selector are not limited, as long as the first data processing sub-circuit including the first register and the data selector can generate the first processed sequence based on the original data.

Figure 2:
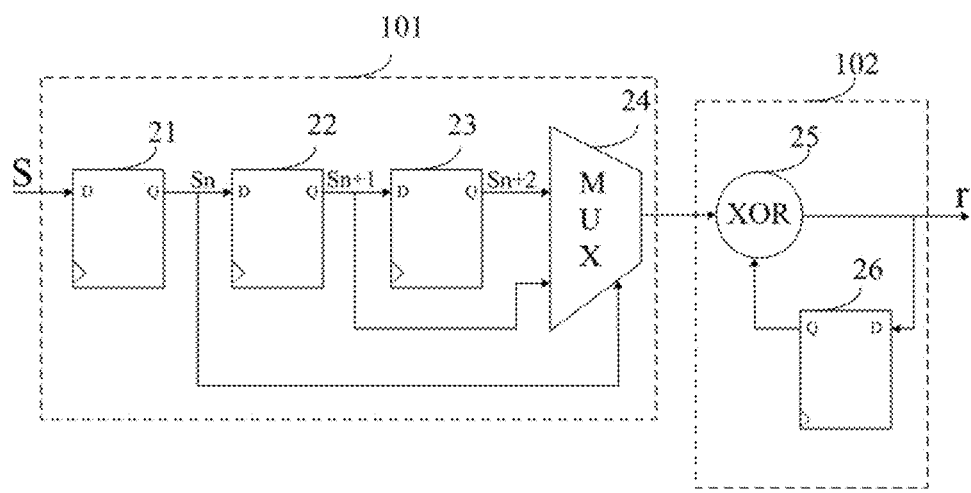
FIG. 2 is a circuit diagram showing a data processing circuit according to an embodiment of the present disclosure.

In an embodiment, FIG. 2 is a circuit diagram showing a data processing circuit provided by an embodiment of the present disclosure. As shown in FIG. 2, the first data processing sub-circuit 101 includes three first registers 21, 22, and 23 and one data selector 24. The three first registers 21, 22, 23 are cascaded in sequence. The first one of the three first registers 21 is configured to receive the original sequence, and each of the three first registers 21, 22, 23 is connected to the data selector 24. The data selector 24 is configured to output the first processed sequence.

In the embodiment, the three first registers 21, 22, and 23 may be the same register or different registers. In the present embodiment, each of the three first registers 21, 22, and 23 is a first D flip-flop. The data selector 24 includes an operational circuit, such as at least one of an AND gate, an OR gate, a NOT gate, and the like.

For example, in some embodiments, the first data processing sub-circuit 101 includes three first registers 21, 22, 23 and one data selector 24. The original sequence is $\{s_1, s_2, s_3, s_4, \ldots s_n\}$ and is named as S with a whole length of n.

The first data processing sub-circuit is configured to perform a first predetermined algorithm to generate the first processed sequence based on the original sequence. In an embodiment, the first predetermined algorithm described above may be, but is not limited to: $fa(n) = s_{n+2} \cdot s_n + \overline{s_{n+2}} \cdot s_{n+1}$, wherein fa(n) is the $n^{th}$ first processed number, $s_n$ is the $n^{th}$ piece of original data of the original sequence, $s_{n+1}$ is the $(n+1)^{th}$ piece of original data of the original sequence, and $s_{n+2}$ is the $(n+2)^{th}$ piece of original data of the original sequence. According to the first predetermined algorithm, each of the first processed numbers in the first processed sequence is calculated according to three pieces of original data in the original data, that is, each of the first processed numbers in the first processed sequence is calculated according to a piece of original data and the two pieces of original data immediately after the piece of original data. It should be understood that the first predetermined algorithm is not limited to the algorithm described above. The first data processing sub-circuit for performing the algorithm also changes accordingly if the first predetermined algorithm changes.

In some embodiments, the second data processing sub-circuit 102 is configured to perform a second predetermined algorithm to generate the second processed sequence based on the first processed sequence. The second predetermined algorithm includes: performing an exclusive-or operation on the $n^{th}$ first processed number (the $n^{th}$ first processed number is obtained through an algorithm of $fa(n) = s_{n+2} \cdot s_n + \overline{s_{n+2}} \cdot s_{n+1}$) in the first processed sequence and the $(n-1)^{th}$ second processed number in the second processed sequence to obtain the $n^{th}$ second processed number in the second processed sequence. In an embodiment, the second predetermined algorithm may be, but is not limited to:

$$fb(n) = fb(n-1) xor [fa(n)]$$

Wherein fa(n) is the $n^{th}$ first processed number, fb(n) is the $n^{th}$ second processed number, and fb(n-1) is the $(n-1)^{th}$ second processed number. According to the second predetermined algorithm, the $n^{th}$ second processed number in the second processed sequence is calculated from the $n^{th}$ first processed number and the $(n-1)^{th}$ second processed number. Of course, it should be understood that the second predetermined algorithm is not limited to the algorithm described above. The second data processing sub-circuit 102 for performing the algorithm also changes accordingly if the second predetermined algorithm changes.

In the embodiment, since the first data processing sub-circuit 101 is configured to perform the first predetermined algorithm $fa(n) = s_{n+2} \cdot s_n + \overline{s_{n+2}} \cdot s_{n+1}$, and the second data processing sub-circuit 102 is configured to perform the second predetermined algorithm $fb(n) = fb(n-1) xor [fa(n)]$, the data processing circuit including the first data processing sub-circuit and the second data processing sub-circuit is configured to perform: $fb(n) = fb(n-1) xor (s_{n+2} \cdot s_n + \overline{s_{n+2}} \cdot s_{n+1})$. It can be seen from the above formula that the processed number of fb(n) in the second processed sequence is related to the processed number of fb(n-1), that is, a value of a processed number in the second processed sequence is related to a value of the immediately previous processed number, therefore, the method implemented by the whole data processing circuit is a chaotic method, that is, a sequence, obtained by the data processing circuit based on the original sequence, is unpredictable.

In an embodiment, the data processing circuit is configured to perform $fb(n) = fb(n-1) xor (s_{n+2} \cdot s_n + \overline{s_{n+2}} \cdot s_{n+1})$. For example, a certain original sequence is 01110101, wherein S1=0, S2=1, S3=1, S4=1, S5=0, S6=1, S7=0, and S8=1. After the processing by the data processing circuit:

$$fb(1) = fb(0) xor (s_3 \cdot s_1 + \overline{s_3} \cdot s_2) = 0 xor (1 \cdot 1 + \overline{1} \cdot 1) = 0.$$

$$fb(2) = fb(1) xor (s_4 \cdot s_{22} + \overline{s_4} \cdot s_3) = 0 xor (1 \cdot 1 + \overline{1} \cdot 1) = 1.$$

$$fb(3) = fb(2) xor (s_5 \cdot s_3 + \overline{s_5} \cdot s_4) = 1 xor (0 \cdot 1 + \overline{0} \cdot 1) = 1.$$

$$fb(4) = fb(3) xor (s_6 \cdot s_4 + \overline{s_6} \cdot s_5) = 1 xor (1 \cdot 1 + \overline{1} \cdot 0) = 0.$$

$$fb(5) = fb(4) xor (s_7 \cdot s_5 + \overline{s_7} \cdot s_6) = 0 xor (0 \cdot 0 + \overline{0} \cdot 1) = 1.$$

$$fb(6) = fb(5) xor (s_8 \cdot s_6 + \overline{s_8} \cdot s_7) = 1 xor (1 \cdot 1 + \overline{1} \cdot 0) = 0$$

The sequence of 011010 is obtained after the original sequence is processed by the data processing circuit, therefore, the randomness and the complexity of the original sequence can be improved through the data processing circuit.

In some embodiments, the second data processing sub-circuit 102 includes a logic processing circuit and a second register. An input terminal of the logic processing circuit is connected to the output terminal of the first data processing sub-circuit, an output terminal of the logic processing circuit is connected to an input terminal of the second register, and serves as an output terminal of the second processing sub-circuit.

The logic processing circuit receives and performs a logic operation on the $n^{th}$ first processed number in the first processed sequence generated by the first data processing sub-circuit and the $(n-1)^{th}$ second processed number in the second processed sequence stored in the second register, to obtain the $n^{th}$ second processed number in the second processed sequence.

With continued reference to FIG. 2, in some embodiments, the logic processing circuit 25 includes an exclusive-or (XOR) gate and the second register 26 includes a second D flip-flop. An output terminal of the second D flip-flop 26 is connected to an input terminal of the XOR gate 25, an output terminal of the XOR gate 25 is connected to an input terminal of the D flip-flop 26, and serves as an output terminal of the second data processing sub-circuit 102. The second D flip-flop 26 may be the same as or different from the first D flip-flops 21, 22 and 23. It should be noted that in the embodiment, the first and second flip-flops are used only for distinguishing between different flip-flops, but the functions thereof are the same, both for registering the sequence data.

Figure 3:
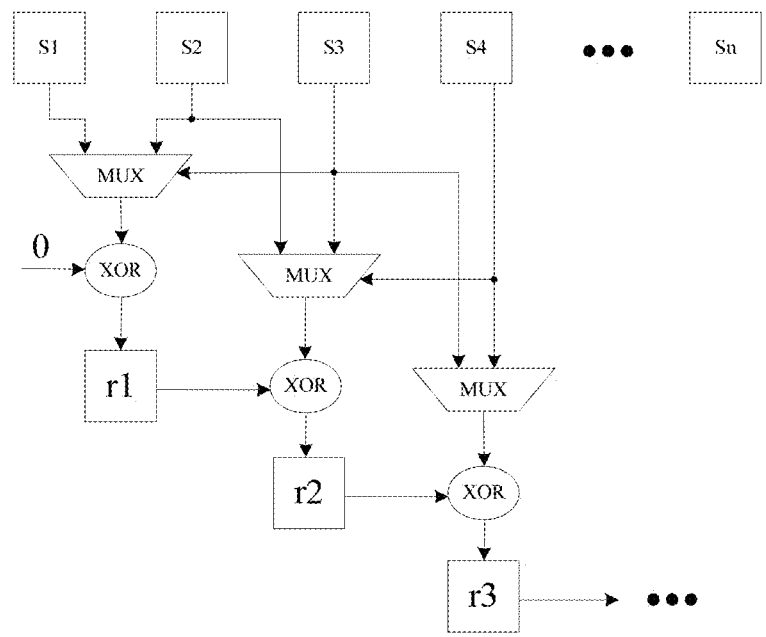
FIG. 3 is a schematic diagram showing a data processing process performed by a data processing circuit according to an embodiment of the present disclosure.

As shown in FIG. 2, the data processing process of the data processing circuit is as follow. The original sequence S is input so as to realize the three-level buffering of the data; and an output is obtained after the original sequence S passes through the data selector 24; an XOR operation is then performed on the output and the previous output, to output one second processed number, as shown in FIG. 3. All of the second processed numbers in the second processed sequence can be obtained based on the same processing steps.

The whole data processing process is described as follows.

$r_n = (s_{n+2} \cdot s_n + \overline{s_{n+2}} \cdot s_{n+1}) \text{xor } r_{n-1}$, wherein $r_n$ is the $n^{th}$ second processed number in the processed second processed sequence, $s_n, s_{n+1}, s_{n+2}$ are the three-level register values of S, and $r_{n-1}$ is a register value of $r_n$.

In an embodiment, when the original sequences input into the data processing circuit are 001 and 011, respectively, one bit of data 0 is generated after both of the sequences are processed by the data processing circuit, therefore even if the output data 0 is stolen, the specific values of $s_n, s_{n+1}, s_{n+2}$ and relationship between $s_n, s_{n+1}, s_{n+2}$ cannot be determined.

In an embodiment, with continued reference to FIG. 2, the data processing circuit includes a first data processing sub-circuit 101 and a second data processing sub-circuit 102. The first data processing sub-circuit 101 includes three first registers 21, 22, 23 and one data selector 24. The second data processing sub-circuit includes a logic processing circuit and a second register. The three first registers 21, 22, 23 are cascaded in sequence. The first one of the first registers 21 is configured to receive the original sequence, and each of the three first registers 21, 22, 23 is connected to the data selector 24. The data selector 24 is configured to output the first processed sequence. The logic processing circuit 25 includes an XOR gate, the second register 26 includes a second D flip-flop. An output terminal of the second D flip-flop 26 is connected to an input terminal of the XOR gate 25, an output terminal of the XOR gate 25 is connected to an input terminal of the D flip-flop 26, and serves as an output terminal of the second data processing sub-circuit 102.

The operation principles for components of the first data processing sub-circuit 101 and the second data processing sub-circuit 102 in the data processing circuit are the same as the operation principles described above, and therefore a detailed description thereof is omitted.

In the embodiment, the first data processing sub-circuit generates the first processed sequence based on the original sequence, and each of the first processed numbers in the first processed sequence is associated with at least two pieces of original data in the original sequence. The second data processing sub-circuit generates the second processed sequence based on the first processed sequence, and each of the second processed numbers in the second processed sequence is associated with a second processed number immediately before the second processed number. Therefore, the second processed sequence generated by the first data processing sub-circuit and the second data processing sub-circuit can be more complicated and more random than the original sequence.

Figure 4:
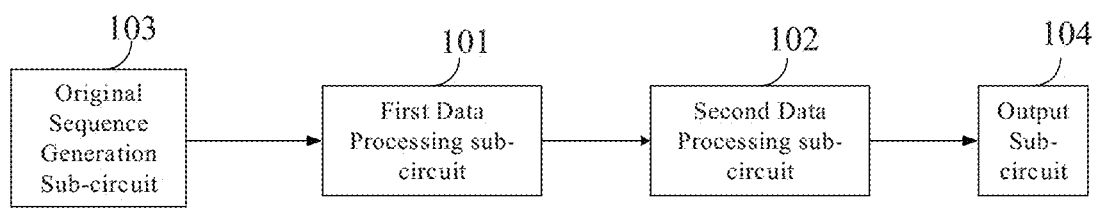
FIG. 4 is a schematic diagram showing a structure of another data processing circuit according to an embodiment of the present disclosure.

FIG. 4 is a schematic diagram showing a structure of another data processing circuit provided in the embodiment of the present disclosure. As shown in FIG. 4, the data processing circuit further includes an original sequence generation sub-circuit 103 and an output sub-circuit 104. The original sequence generation sub-circuit 103 is configured to randomly generate the original sequence. The output sub-circuit 104 is configured to output the second processed sequence in the form of an image.

In some embodiments, the output sub-circuit 104 includes, but is not limited to, a level conversion module (not shown) for converting a voltage signal output by the second data processing sub-circuit into a digital signal, and a display module (not shown) for outputting image data, including, but being not limited to, a digital image or a color image, in response to the digital signal input by the level conversion module. The digital image includes, but is not limited to, a binary sequence, IDs, etc.; and the color image includes, but is not limited to, an image made up of black and white squares.

In some embodiments, the original sequence generation sub-circuit 103 includes a random number generator and a digital chip fingerprint generator.

Figure 5:
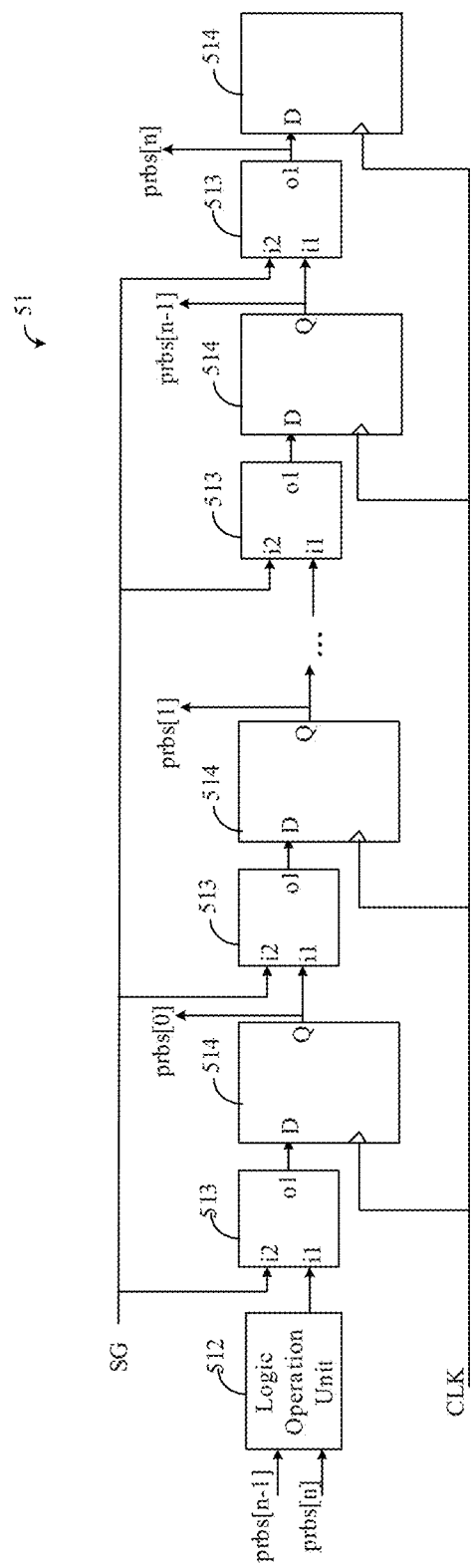
FIG. 5 is a schematic diagram showing a random number generator according to an embodiment of the present disclosure.

In some embodiments, as shown in FIG. 5, the random number generator 51 includes a logic operation unit 512, a shift register and a plurality of data selectors 513. The number of bits of random number seed SG is n+1. The shift register includes (n+1) D flip-flops 514 cascaded together. Input terminals of the (n+1) D flip-flops 514 are connected in a one-to-one correspondence to output terminals o1 of the (n+1) data selectors 513, respectively. Specifically, an input terminal of the $1^{st}$ flip-flop 514 is connected to an output terminal o1 of the $1^{st}$ data selector 513, an input terminal of the $2^{nd}$ D flip-flop 514 is connected to an output terminal o1 of the $2^{nd}$ data selector 513, and so on, until an input terminal of the $(n+1)^{th}$ D flip-flop 514 is connected to an output terminal o1 of the $(n+1)^{th}$ data selector 513. A first input terminal i1 of the $1^{st}$ data selector 513 is connected to an output terminal of the logical operation unit 512, and a first input terminal i1 of the $j^{th}$ data selector 513 is connected to an output terminal of the $(j-1)^{th}$ D flip-flop 514, where j is an integer and 1<j≤n+1. The values of the (n+1) bits of the random number seed SG are respectively input to second input terminals i2 of the (n+1) data selectors 512, and two input terminals of the logic operation unit 512 are respectively connected to the output terminals of the last two D flip-flops 514. When the random number generator 51 is triggered to generate random numbers, the second input terminal i2 of each of the data selectors 513 is controlled to be connected to the output terminal o1 of the data selector 513, so that the (n+1) bits of the random number seed SG are input to the input terminals of the (n+1) D flip-flops 514, respectively. And then, the first input terminal i1 of each of the data selectors 513 is controlled to be connected to the output terminal o1 of the data selector 513. The bits in one binary sequence output by the (n+1) D flip-flops 514 are denoted as prbs [0], prbs [1] . . . prbs [n], respectively. The bits prbs[n−1] and prbs[n] are input to the two input terminals of the logical operation unit 512, respectively.

For example, a plurality of binary sequences generated by repeatedly performing, by the random number generator 51, a right shift operation are arranged in sequence to form a random number sequence. A first bit prbs [0] of the first one of the plurality of binary sequences serves as the first bit of the random number sequence, and the last bit prbs [n] of the last one of the plurality of binary sequences serves as the last bit of the random number sequence.

For example, in a case where the random number seed is 01100010, the random number generator 51 generates a binary sequence of 10110001 by performing the right shift operation for the first time, generates a binary sequence of 11011000 by performing the right shift operation for the second time, generates a binary sequence of 01101100 by performing the right shift operation for the third time, and generates a binary sequence of 00110110 by performing the right shift operation for the fourth time; and so on. The random number sequence is formed by sequentially arranging the four binary sequences according to the generated order, that is, the random number sequence is 10110001110110000110110000110110.

Figure 6:
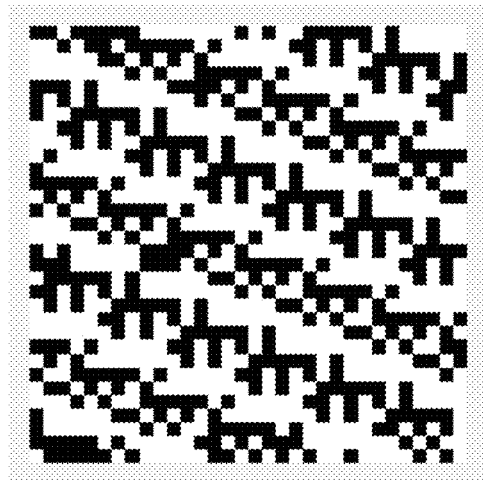
FIG. 6 a schematic diagram showing an image effect of an original sequence generated by a random number generator according to an embodiment of the present disclosure.
Figure 7:
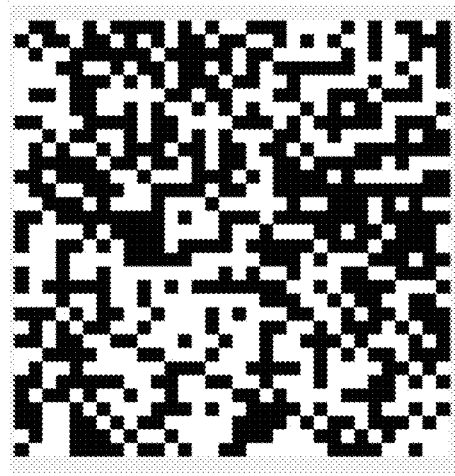
FIG. 7 is a schematic diagram showing an image effect of a sequence generated by processing of the data processing circuit according to an embodiment of the present disclosure.

FIG. 6 is a schematic diagram showing an image effect of the original sequence generated by the random number generator 51 according to some embodiments of the present disclosure. Each of the pixel points corresponds to one random number, and a gray level of each of the pixel points is determined according to a value of the corresponding random number. The pixel point is black when the random number is 0, and the pixel point is white when the random number is 1. FIG. 7 is a schematic diagram showing an image effect of the sequence processed by the data processing circuit according to the original sequence in FIG. 6. It can be seen that the processed sequence has a higher improvement in both complexity and randomness.

Figure 8:
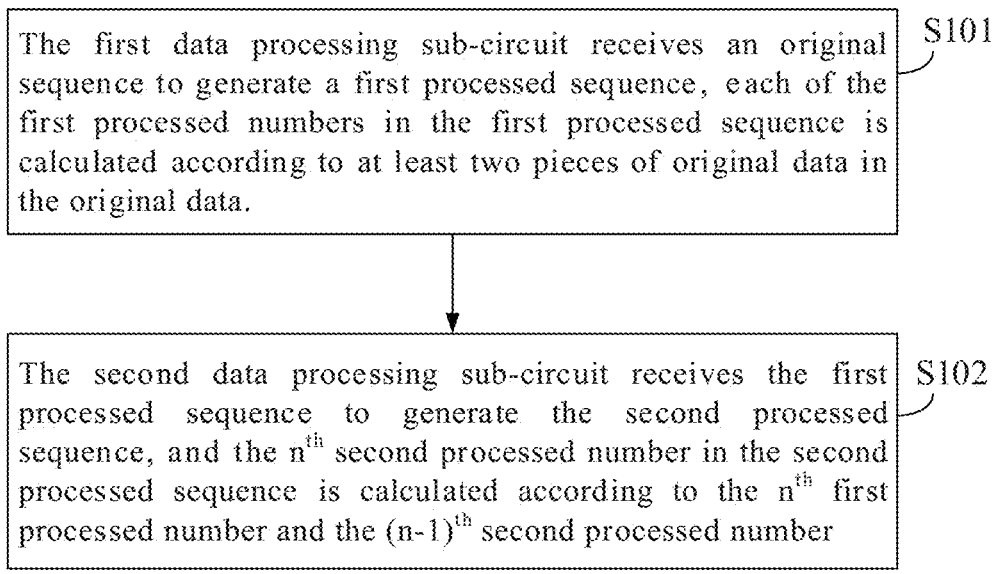
FIG. 8 is a flowchart showing a data processing method according to an embodiment of the present disclosure.

FIG. 8 is a flowchart showing a data processing method provided in an embodiment of the present disclosure. As shown in FIG. 8, the data processing method is applied to above data processing circuit, and the method includes steps S101 and S102.

At step S101, the first data processing sub-circuit receives an original sequence to generate a first processed sequence. Each of the first processed numbers in the first processed sequence is calculated according to at least two pieces of original data in the original data.

In the embodiment, the first data processing sub-circuit 101 receives an original sequence to generate the first processed sequence. Specifically, the original sequence is a data sequence to be encrypted. The original sequence includes a plurality pieces of original data, and the first processed sequence includes a plurality of first processed numbers. The first data processing sub-circuit 101 is configured to receive the original sequence including the plurality pieces of original data, calculate each of the first processed numbers according to at least two pieces of original data so as to obtain the first processed sequence, and output the first processed sequence to the second data processing sub-circuit 102.

At step S102, the second data processing sub-circuit receives the first processed sequence to generate the second processed sequence. The $n^{th}$ second processed number in the second processed sequence is calculated according to the $n^{th}$ first processed number and the $(n-1)^{th}$ second processed number, n being a positive integer more than or equal to two.

In the present embodiment, the second data processing sub-circuit 102 is configured to receive the first processed sequence to generate the second processed sequence. Specifically, the second processed sequence is an encrypted data sequence, and the second processed sequence includes a plurality of second processed numbers. The second data processing sub-circuit 102 calculates the $n^{th}$ second processed number according to the $n^{th}$ first processed number and the $(n-1)^{th}$ second processed number based on the acquired first processed sequence, so as to obtain the second processed sequence.

In the embodiment, the first data processing sub-circuit generates the first processed sequence based on the original sequence, and the second data processing sub-circuit generates the second processed sequence based on the first processed sequence, such that the generated second processed sequence can be more complex and more random than the original sequence.

An embodiment of the present disclosure further provides an electronic device, which includes the data processing circuit provided in the embodiment of the present disclosure.

The electronic device in the embodiments of the present disclosure may be a chip in a communication device. Each component in the data processing circuit provided by the embodiment of the present disclosure adopts a digital circuit, so that the data processing circuit can be easily integrated into various chips.

The sequence generated by the data processing circuit in the embodiment of the present disclosure has higher complexity and randomness, thereby improving the safety and reliability of the electronic device in communication.

It should be understood that the above implementations are merely exemplary embodiments for the purpose of illustrating the principles of the present disclosure, however, the present disclosure is not limited thereto. It will be apparent to one of ordinary skill in the art that various changes and modifications can be made without departing from the spirit and essence of the present disclosure, which are also to be regarded as the scope of the present disclosure.

What is claimed is:

1. A data processing circuit comprising a first data processing sub-circuit and a second data processing sub-circuit; wherein
    an output terminal of the first data processing sub-circuit is connected to an input terminal of the second data processing sub-circuit,
    the first data processing sub-circuit is configured to receive an original sequence to generate a first processed sequence, wherein each of first processed numbers in the first processed sequence is calculated from at least two pieces of original data in the original sequence, and
    the second data processing sub-circuit is configured to receive the first processed sequence to generate a second processed sequence, wherein $n^{th}$ second processed number in the second processed sequence is calculated from $n^{th}$ first processed number and $(n-1)^{th}$ second processed number, n being a positive integer more than or equal to two,
    the first data processing sub-circuit comprises a first register and a data selector connected to each other,
    the first register is configured to receive the original sequence, and
    the data selector is configured to receive the original sequence stored in the first register to generate the first processed sequence.

2. The data processing circuit of claim 1, wherein
    the first data processing sub-circuit comprises three first registers and one data selector, the three first registers are cascaded in sequence,
a first one of the three first registers is configured to receive the original sequence,
each of the three first registers is connected to the data selector, and
the data selector is configured to output the first processed sequence.

3. The data processing circuit of claim 2, wherein
the first data processing sub-circuit is configured to perform a first predetermined algorithm on the original sequence and generate the first processed sequence based on the original sequence, and
the first predetermined algorithm comprises: $fa(n)=s_n + 2 \cdot s_n + \overline{s_{n+2}} \cdot s_{n+1}$, wherein $fa(n)$ is a first processed number, $s_n$ is $n^{th}$ piece of original data of the original sequence, $s_{n+1}$ is $(n+1)^{th}$ piece of original data of the original sequence, and $s_{n+2}$ is $(n+2)^{th}$ piece of original data of the original sequence.

4. The data processing circuit of claim 2, wherein the first register comprises a first D flip-flop.

5. The data processing circuit of claim 1, wherein
the second data processing sub-circuit comprises a logic processing circuit and a second register,
an input terminal of the logic processing circuit is connected to the output terminal of the first data processing sub-circuit, an output terminal of the logic processing circuit is connected to an input terminal of the second register and serves as an output terminal of the second processing sub-circuit, and
the logic processing circuit is configured to receive a $n^{th}$ first processed number in the first processed sequence generated by the first data processing sub-circuit and a $(n-1)^{th}$ second processed number in the second processed sequence stored in the second register and perform a logic operation on the $n^{th}$ first processed number in the first processed sequence generated by the first data processing sub-circuit and the $(n-1)^{th}$ second processed number in the second processed sequence stored in the second register, to obtain $n^{th}$ second processed number in the second processed sequence.

6. The data processing circuit of claim 5, wherein
the logic processing circuit comprises an XOR gate and the second register comprises a second D flip-flop, and
an output terminal of the second D flip-flop is connected to an input terminal of the XOR gate, an output terminal of the XOR gate is connected to an input terminal of the second D flip-flop and serves as an output terminal of the second processing sub-circuit.

7. The data processing circuit of claim 1, further comprising an original sequence generation sub-circuit configured to randomly generate the original sequence.

8. The data processing circuit of claim 7, wherein the original sequence generation sub-circuit comprises a random number generator or a digital chip fingerprint generator.

9. The data processing circuit of claim 1, further comprising an output sub-circuit configured to output the second processed sequence in a form of an image.

10. The data processing circuit of claim 9, wherein the image comprises a digital image or a color image.

11. A data processing method for the data processing circuit of claim 1, the method comprising:
receiving, by the first data processing sub-circuit, the original sequence to generate the first processed sequence, wherein each of the first processed numbers in the first processed sequence is calculated from the at least two pieces of original data in the original sequence; and
receiving, by the second data processing sub-circuit, the first processed sequence to generate the second processed sequence, wherein the $n^{th}$ second processed number in the second processed sequence is calculated from the $n^{th}$ first processed number and the $(n-1)^{th}$ second processed number, n being a positive integer more than or equal to two.

12. An electronic device comprising the data processing circuit of claim 1.

13. A data processing circuit comprising a first data processing sub-circuit and a second data processing sub-circuit; wherein
the first data processing sub-circuit is configured to receive an original sequence to generate a first processed sequence,
the second data processing sub-circuit is configured to receive the first processed sequence to generate a second processed sequence,
the first data processing sub-circuit comprises three first registers cascaded in sequence and one data selector,
a first one of the three first registers is configured to receive the original sequence,
each of the three first registers is connected to the data selector, and
the data selector is configured to output the first processed sequence,
the second data processing sub-circuit comprises an XOR gate and a second register,
an output terminal of the second register is connected to an input terminal of the XOR gate, an output terminal of the XOR gate is connected to an input terminal of the second register and serves as an output terminal of the second processing sub-circuit.

14. An electronic device comprising the data processing circuit of claim 13.

* * * * *

UNITED STATES PATENT AND TRADEMARK OFFICE
CERTIFICATE OF CORRECTION

| | |
|---|---|
| PATENT NO. | : 11,789,897 B2 |
| APPLICATION NO. | : 17/427235 |
| DATED | : October 17, 2023 |
| INVENTOR(S) | : Xiangye Wei and Liming Xiu |

It is certified that error appears in the above-identified patent and that said Letters Patent is hereby corrected as shown below:

On the Title Page

Item (73), please remove Assignee 1 "BOE TECHNOLOGY DEVELOPMENT CO., LTD." and replace with "BEIJING BOE TECHNOLOGY DEVELOPMENT CO., LTD.".

Signed and Sealed this
Nineteenth Day of December, 2023

Katherine Kelly Vidal
*Director of the United States Patent and Trademark Office*